US007454460B2

(12) United States Patent
Ivashin

(10) Patent No.: US 7,454,460 B2
(45) Date of Patent: Nov. 18, 2008

(54) METHOD AND SYSTEM FOR DELIVERING PRODUCED CONTENT TO PASSIVE PARTICIPANTS OF A VIDEOCONFERENCE

(75) Inventor: Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 875 days.

(21) Appl. No.: 10/440,545

(22) Filed: May 16, 2003

(65) Prior Publication Data

US 2004/0230651 A1   Nov. 18, 2004

(51) Int. Cl.
    *G06F 15/16* (2006.01)
    *G09G 5/00* (2006.01)
    *H04N 7/14* (2006.01)

(52) U.S. Cl. .................. 709/203; 709/204; 709/205; 715/751; 348/14.09

(58) Field of Classification Search .................. 709/203, 709/204, 205; 715/751; 348/14.08, 14.09
    See application file for complete search history.

(56) References Cited

U.S. PATENT DOCUMENTS

| 5,657,096 | A  | 8/1997  | Lukacs          |
| 5,657,246 | A  | 8/1997  | Hogan et al.    |
| 5,737,011 | A  | 4/1998  | Lukacs          |
| 5,872,922 | A  | 2/1999  | Hogan et al.    |
| 5,896,128 | A  | 4/1999  | Boyer           |
| 5,963,547 | A  | 10/1999 | O'Neil et al.   |
| 5,991,276 | A  | 11/1999 | Yamamoto        |
| 5,999,966 | A  | 12/1999 | McDougall et al.|
| 6,006,253 | A  | 12/1999 | Kumar et al.    |
| 6,075,571 | A  | 6/2000  | Kuthyar et al.  |
| 6,119,147 | A  | 9/2000  | Toomey et al.   |
| 6,195,091 | B1 | 2/2001  | Harple et al.   |
| 6,202,084 | B1 | 3/2001  | Kumar et al.    |
| 6,330,022 | B1 * | 12/2001 | Seligmann ............... 348/14.08 |
| 6,343,313 | B1 | 1/2002  | Salesky et al.  |
| 6,473,114 | B1 * | 10/2002 | Strubbe .................... 348/14.07 |
| 6,507,865 | B1 * | 1/2003  | Hanson et al. ............ 705/36 R |
| 6,526,445 | B1 * | 2/2003  | Kumar et al. ............... 709/227 |
| 6,590,603 | B2 * | 7/2003  | Sheldon et al. .......... 348/14.09 |
| 6,757,005 | B1 * | 6/2004  | Elbaz et al. .............. 348/14.09 |
| 7,007,098 | B1 * | 2/2006  | Smyth et al. ................. 709/233 |

(Continued)

FOREIGN PATENT DOCUMENTS

WO    WO 97/49244    12/1997

OTHER PUBLICATIONS

Centralized versus Distributed Schemes for Videoconferencing, M.H. Willebeek-LeMair, Z.Y. Shae, Proceedings of the 5th IEEE Workshop on Future Trends of Distributed Computing Systems (FTDCS '95), pp. 85-93.

*Primary Examiner*—Philip C Lee

(57) ABSTRACT

A conferencing system supporting active and passive participants is disclosed. The conferencing system includes a client component defining active and passive participants, and a server component having a connection to each active and passive participant defined in the client component. The server component includes a connection manager for managing the connection between each active and passive participant and the server component, a media mixer for receiving conference media and for distributing conference media to active and passive participants, and a virtual producer for selecting conference media to be distributed to passive participants. The conference media provided to the passive participants is dynamically determined based upon activities and selections of a set of active participants.

10 Claims, 9 Drawing Sheets

U.S. PATENT DOCUMENTS

| | | | |
|---|---|---|---|
| 7,007,235 B1 * | 2/2006 | Hussein et al. | 715/751 |
| 7,245,660 B2 * | 7/2007 | Yona et al. | 375/240.13 |
| 2001/0043571 A1 | 11/2001 | Jang et al. | |
| 2002/0073151 A1 | 6/2002 | Rogers et al. | |
| 2002/0083137 A1 | 6/2002 | Rogers et al. | |
| 2003/0149724 A1 * | 8/2003 | Chang | 709/204 |
| 2004/0008635 A1 * | 1/2004 | Nelson et al. | 370/260 |
| 2006/0064716 A1 * | 3/2006 | Sull et al. | 725/37 |
| 2006/0252547 A1 * | 11/2006 | Mizahi et al. | 463/42 |

* cited by examiner

METHOD AND SYSTEM FOR DELIVERING PRODUCED CONTENT TO PASSIVE PARTICIPANTS OF A VIDEOCONFERENCE

CROSS REFERENCE TO RELATED APPLICATION

This application is related to U.S. patent application Ser. No. 10/192,080 filed on Jul. 10, 2002 and entitled "Multi-Participant Conference System with Controllable Content Delivery Using a Client Monitor Back-Channel." This related application is hereby incorporated by reference herein for all purposes.

BACKGROUND OF THE INVENTION

1. Field of the Invention

The present invention relates generally to multi-participant conferencing systems, and more particularly to real-time content delivery for passive participants based upon activities of active participants in an integrated multi-participant conferencing system with feedback from active participants provided through back-channel connections.

2. Description of the Related Art

Conferencing systems generally describe the ways in which a set of participants can collaborate. The structures of conferencing systems establish the rules for information exchange. Methods of communication are defined and the accessible media types are identified within the conferencing system structure. Some systems may allow for communication with remote or mobile participants, while others limit access to dedicated locations or members. Features such as grouping participants into logical meeting spaces, assigning security access rights to a collaboration, specializing in particular types of media communication, and so forth, are all elements of various conferencing systems.

Different forms of collaboration typically require different systems or configurations to manage the needs of the communication. For example, if the collaboration takes the form of educational training, the system must accommodate a presenter to manage content and direct lecture material to an audience or to one or more groups of participants. For a group or panel discussion or collaboration among participants in separate locations, the system must accommodate simultaneous inputs and outputs from participants with a contributing role in the exchange in each location. In a telephone-based conference system, only audio communication is available. With a video-based conference system, participants require more specialized devices to contribute the visual component for face-to-face collaboration and exchange, and for the collaboration and exchange associated with other visual media such as documents, presentation slides, images, and so forth.

One collaboration model is known as a one-to-one collaboration. In a one-to-one collaboration, the conference rules, also referred to as collaboration rules, are simple: participant media is simply exchanged. Each participant hears the other's audio and views the other's video. Conventional decorum and social norms generally control the exchange as each participant waits for the other to finish a communication before offering a reply, response, or other contribution to the exchange. This "full duplex" communication style is a close approximation of in-person exchange, and allows for interruption and free expression. Some conferencing systems, however, impose restrictive communication rules due to system requirements or limitations. Such system rules might include a requirement for clues to signal when one participant is completed transmitting (i.e., "half duplex"), permission to initiate a reply or new transmission, etc. In either system, an independent observer of the one-to-one collaboration might simply follow the exchange among participants, likely concentrating attention at any given time to the one actively speaking.

Another collaboration model is a one-to-many collaboration. In a one-to-many collaboration, the "one" is typically denoted as a speaker or presenter, and the "many" are an attending "audience" or participants. A primarily unidirectional exchange, the one-to-many collaboration requires all audience members to be able to hear and see the activities of the speaker (i.e., the speaker's media is transmitted to all participants). For the audience members, the activities of other participants (i.e., audio and/or video media of the audience) may not be desirable, and could be detrimental to the effectiveness of the one-to-many collaboration. The speaker may, however, be interested in audience feedback to the presentation and wish to be aware of interruptions or questions. Further, in some one-to-many collaboration models, the speaker can control when and who can speak, as during a question and answer period. At that time, audience members may wish to hear the participant asking a question in addition to the speaker's response. Conference systems for one-to-many collaborations therefore require more complex rules than a one-to-one collaboration. An independent observer of a one-to-many collaboration might follow along with the speaker in control, or may choose to watch reaction or any contribution made by audience participants.

Yet another collaboration model is a group discussion. In a group discussion, rules of collaboration may not be narrowly defined, and may operate similarly to a one-to-one collaboration. e.g., with a multitude of one-to-one collaborations occurring. Exchange of media occurs among all participants, and accepted social norms and customs may define the order of exchange. Panel discussions, on the other hand, may demand elaborate collaboration rules for moderation and time management. A panel discussion, a particular type of group discussion which may be defined as a group-to-many collaboration model, requires only a subset of participants to act in a contributing role in the collaboration (i.e., media from each panel participant is transmitted to all audience participants). Remaining participants may be audience members listening/watching (observing) the panel members' exchange. One or more specialized participants may be assigned the role of moderator tasked to control the discussion and keep the direction of the collaboration focused on topic, within defined time constraints, in accordance with pre-defined collaboration rules, and so forth. The moderators may have special control over speaking rights, time allocated to panel members, or exchange with audience members at designated times such as question and answer sessions. Again, an independent observer of the exchanges in these group collaboration models likely follows the "topic" as it is revealed within the context of the exchange of media.

In a conference environment there are usually many media choices available. Real-time audio and video signals of various formats are the primary types of media. Documents, presentation slides, images, and the like further expand the media options. Conferencing systems are generally limited by the number and types of media they support, and superior support for a particular set of media types is one way in which conferencing systems differentiate themselves.

The number of media available during a conference can be larger than the count of attending participants. Microphones may supply audio from each conference location and/or each participant. Multiple cameras offering different views of subjects may provide video media capturing the speaker, other participants, or other groups/locations.

Prior art conferencing systems are typically configured and operated to facilitate media exchange and communication. Participants in a conference may be configured to provide media to the system. In each of the collaboration models described above, "active" participants are generally enabled to contribute media, and to participate within the context of the media contributed by other participants. Importantly, each active participant has control over the media s/he is observing and exchanging. Observers of a conference, however, are generally not configured to contribute media. A "passive" participant, an observer, is able to view, listen to, or monitor the media as provided by the conferencing system. A passive participant has no control over media exchange or contribution, and relies on the conferencing system to provide a "view" of, or subset of, the "interesting media" exchanged during a collaboration. In some conferencing environments, a particular active participant is designated as the feed for the passive participant. Whatever media is selected by the designated active participant, and however the media is configured to be viewed, listened to, or observed by the designated active participant will be mirrored to the passive participant. If, for example, the designated active participant is a presenter in a collaboration, then audience feedback and core presentation media may be all that is provided to the passive participant as said media is the only media the presenter participant is monitoring. In other conferencing systems, a third-party media producer may be utilized to select and configure the presentation of appropriate media for the passive participant. While the third-party media producer would ideally provide a balanced selection of "interesting" media, the choice of "interesting" is limited by the third party serving as the media producer, and the selection of interest becomes increasingly difficult as the number and diversity of medias and of participants, both active and passive, increases. By way of example, in a one-to-many or group-to-many collaboration involving multiple locations, interest in one location may be vastly different than interest in another location. The selection and configuration of media provided to the passive participant may suffice to meet the needs of one location/group while being wholly inadequate for another location/group. What is needed is a conferencing system that provides automated and intelligent content and content delivery features to meet the needs of passive participants ranging in numbers from one to many, and ranging in interests from uniform to diverse.

SUMMARY OF THE INVENTION

Broadly speaking, the present invention fills these needs by providing a multi-participant videoconferencing system having a virtual producer module that deduces and ranks interest in conference media and produces a content and presentation layout of selected media for a passive participant of the multi-participant videoconference. The present invention can be implemented in numerous ways, including as a process, an apparatus, a system, a device, a method, or a computer readable media. Several embodiments of the present invention are described below.

In one embodiment, a conferencing system supporting active and passive participants is provided. The conferencing system is one in which an active participant selects and configures media for the active participant and the conferencing system selects and provides media to a passive participant. The conferencing system includes a client component defining active and passive participants, and a server component having a connection to each of the active and passive participants defined in the client component. The server component includes a connection manager for managing the connection between each of the active and passive participants and the server component, a media mixer for receiving conference media and for distributing conference media to active and passive participants, and a virtual producer for selecting conference media to be distributed to the passive participant. The conference media provided to the passive participant is dynamically determined based upon activities and selections of a set of active participants.

In another embodiment, a videoconferencing system supporting active and passive participants is provided. The videoconferencing system includes a client component defining active and passive participants, and a server component having a connection to each active and passive participant defined in the client component. The server component includes a virtual producer for analyzing conference media and for selecting conference media to be provided to passive participants. The conference media provided to the passive participants is dynamically determined by the virtual producer based upon activities and selections of a set of active participants.

In a further embodiment, a method for determining a set of multiple media streams to deliver to a participant in a videoconference is provided. The method includes determining a raw ranking of all media streams in the videoconference, and analyzing the raw ranking of all media streams. The method further filters the raw ranking of all media streams, and selects a set of multiple media streams from the filtered raw ranking. The selected set of multiple media streams is delivered to the participant in the videoconference.

In yet another embodiment, a method of producing a media presentation for passive participants in a multi-participant videoconference is provided. The multi-participant videoconference has active participants and passive participants, and the method includes determining a raw media ranking of all media in the multi-participant videoconference. The method further provides for filtering the raw media ranking, and for selecting media from the filtered raw media ranking to be provided to passive participants. The selected media is provided to passive participants in the multi-participant videoconference. The multi-participant videoconference system produces and provides the media presentation to passive participants.

In another embodiment, a computer readable media having program instructions for providing a media presentation to a passive participant in a multi-participant videoconference is provided. The computer readable media includes program instructions to determine a raw ranking of all media streams in the videoconference, and program instructions to analyze the raw ranking of all media streams. Also provided are program instructions to filter the raw ranking of all media streams, and program instructions to select a set of multiple media streams from the filtered raw ranking. Program instructions are also provided to deliver the selected set of multiple media streams to the passive participant in the videoconference.

The advantages of the present invention over the prior art are numerous and will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

An invention for analysis, selection, and delivery of interesting content to passive participants in a videoconference is described. In the following description, numerous specific details are set forth in order to provide a thorough understanding of the present invention. It will be understood, however, to one skilled in the art, in light of this disclosure, that the present invention may be practiced without some or all of these specific details. In other instances, well known process operations have not been described in detail in order not to unnecessarily obscure the present invention.

The embodiments of the present invention provide a method and system to produce intelligent, interest-based selections of media for passive participants in a videoconference. As used herein, media includes any suitable type of information or data encountered within a videoconference environment, e.g., POWERPOINT presentation images, video/audio streams, raster/vector images, annotations, documents, etc. Embodiments of the present invention may be implemented in a videoconference system as described in U.S. patent application Ser. No. 10/192,080 referenced above.

Figure 1:
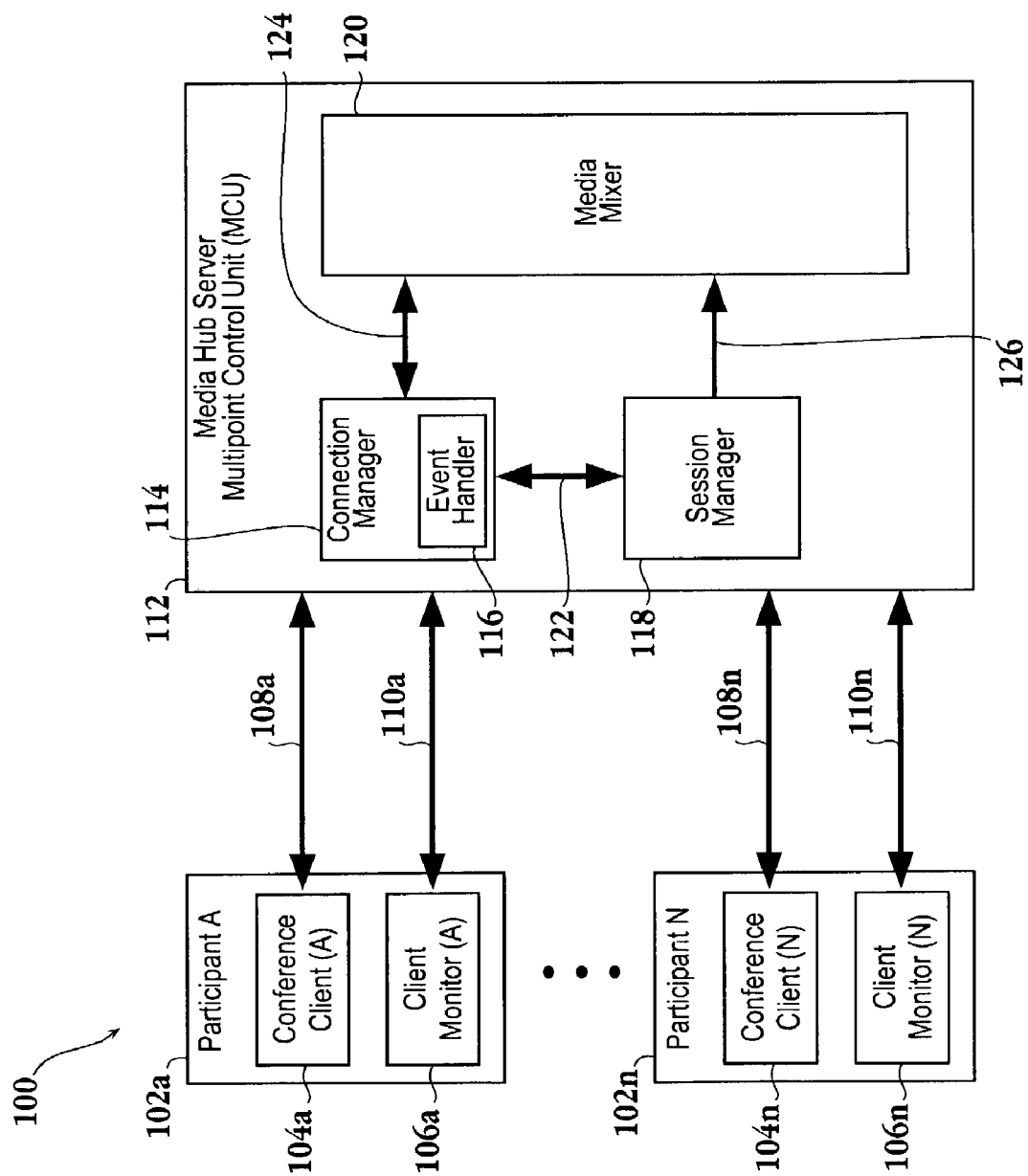
FIG. 1 is a schematic of a multi-participant conferencing system having a client monitor back-channel.

As an overview, a general description of a videoconferencing system in which embodiments of the present invention can be implemented is provided. FIG. 1 is a schematic of a multi-participant conferencing system 100 having a client monitor back-channel 110, illustrated as back-channels 110a-100n. Multi-participant conferencing system 100 includes conference participants A-N, illustrated as participant A 102a-participant N 102n, with each conference participant 102 having a conference client 104, illustrated as conference clients 104a-104n, and a client monitor 106, illustrated as client monitors 106a-106n. A conference channel 108, illustrated as conference channels 108a-108n, and a back-channel 110, illustrated as back-channels 110a-110n, connect each conference participant 102 with a multipoint control unit (MCU) 112 of a media hub server. The MCU 112 includes a connection manager 114 having an event handler 116, a session manager 118, and a media mixer 120.

In the illustrated multi-participant conferencing system 100, conference client 104 provides local functionality for a participant 102 and allows access to the conference system. Media content contributed by the participant 102 is routed through the conference client 104 to the MCU 112 via conference channel 108. Additionally, media is received and played by the conference client 104 from the MCU 112 via conference channel 108.

In one embodiment, conferencing system 100 enhances pre-existing conference client software such as a peer-to-peer videoconferencing application that may be installed on a personal computer connected to the videoconference. One example of a peer-to-peer videoconferencing application is MICROSOFT'S NETMEETING application. Increased functionality is enabled through data provided by the client monitor 106. In one embodiment, client monitor 106 incorporates a graphical user interface (GUI) in which the video window of the peer-to-peer application is a component.

Client monitor 106 provides captured input from the conference client 104 to the MCU 112. The captured input is transmitted to the MCU 112 through the separate back-channel connection 110 that operates in parallel with conference channel 108. In one embodiment, back-channel 110 enables the MCU 112 to dynamically modify the GUI being presented to a participant 102 based on the captured input provided to the MCU 112. For example, client monitor 106 can capture events, such as mouse and keyboard activity of the participant 102, such as that activity used to configure and display the video and other media signals presented to conference client 104. In one embodiment, the activity is captured and transmitted through back-channel 110 to the MCU 112 for interpretation. Back-channel 110 thereby allows for active regions, user interface objects, and the like, within the video stream to be used to control functionality and content. Consequently, participants 102 control video given to different regions in a selected media layout both directly through active contribution and selection via conference channel 108 and indirectly through feedback via back-channel 110 for MCU 112 processing of client events.

MCU 112 is the primary server in conferencing system 100 and facilitates multi-participant conferencing among connected participants 102a-102n. All other components are managed and maintained within MCU 112. Connection manager 114 assists in the physical connection between MCU 112 and participants 102a-102n. Acting as a peer endpoint for each of participants 102a-102n, connection manager 114 is where all media enters and exits the MCU 112 for a given participant 102. Back-channel 110 equipped participants 102a-102n connect with connection manager 114 for resolution of events, through the event handler 116.

Event handler 116 monitors each participant's 102a-102n activity and provides input to the media mixer 120 via 124 to configure a media layout. Each event creates a context marker that correlates with video, audio, or other media data at the time of activity. An analysis method examines the set of all context markers in relation to a given media data to extract an "interest region".

Session Manager 118 defines the rules that govern each type of conference collaboration and controls both system and participant media exchange behaviors accordingly. Session manager 118 can limit the content available to participants 102a-102n for their manipulation or control. Session manager 118 can also define the roles of a set of one or more participants 102 and offer functions appropriate to their roles. By way of example, session manager 118 may define presentation rules that favor control of a conference by a speaker participant 102 over audience participants 102. When an audience participant 102 has a question, the rules may dictate that the speaker participant 102 must signal the system to call upon the audience participant 102 with the question, allow the audio of the audience participant 102 to pass through the system, and then return control to the speaker participant 102 for comments. In defining panel discussion rules, session manager 118 may define a small set of participants 102 to constitute the "primary" participants 102, while other participants 102 attend in an essentially observation mode only. Session manager 118 functions include controlling content and activity based upon the collaboration model.

Media mixer 120 receives conference media from each contributing participant 102a-102n and delivers the appropriate media to each participant 102a-102n in the conference, as appropriate. Some media signals may be combined as appropriate for more efficient delivery. Media mixer 120 receives instruction from a number of sources including event handler 116, and session manager 118, to control the layout and content of media delivery for each participant 102a-102n.

Embodiments of the present invention implemented in a videoconferencing system 100 as illustrated in FIG. 1 enhance the content distributed through the illustrated videoconferencing system 100 by providing an adaptive content delivery system for a multi-participant videoconference that accommodates both active and passive participants. The inventive system monitors the contributed collaboration media, the behaviors and interactions of a set of active-participants, and the rules governing the conference to determine the "important" or most relevant content and layout for the communication. The system incorporates a "virtual producer" to analyze the activities and inputs, and to select a subset of the available contributed media for distribution -to participants passively viewing the conference (i.e., those participants having limited capability to direct their conference experience, or those participants choosing a passive view even though capabilities are sufficient for activity or input).

Embodiments of the present invention include a feedback mechanism to provide "interest markers" that further define and assign an importance to a content of conference media. Media importance can be used to change the delivery, quality, and presentation of said media in real-time, emphasizing media of greater significance or interest while reducing system burden (e.g., an amount of system resources required for processing selected media) of unnecessary media processing.

Figure 2:
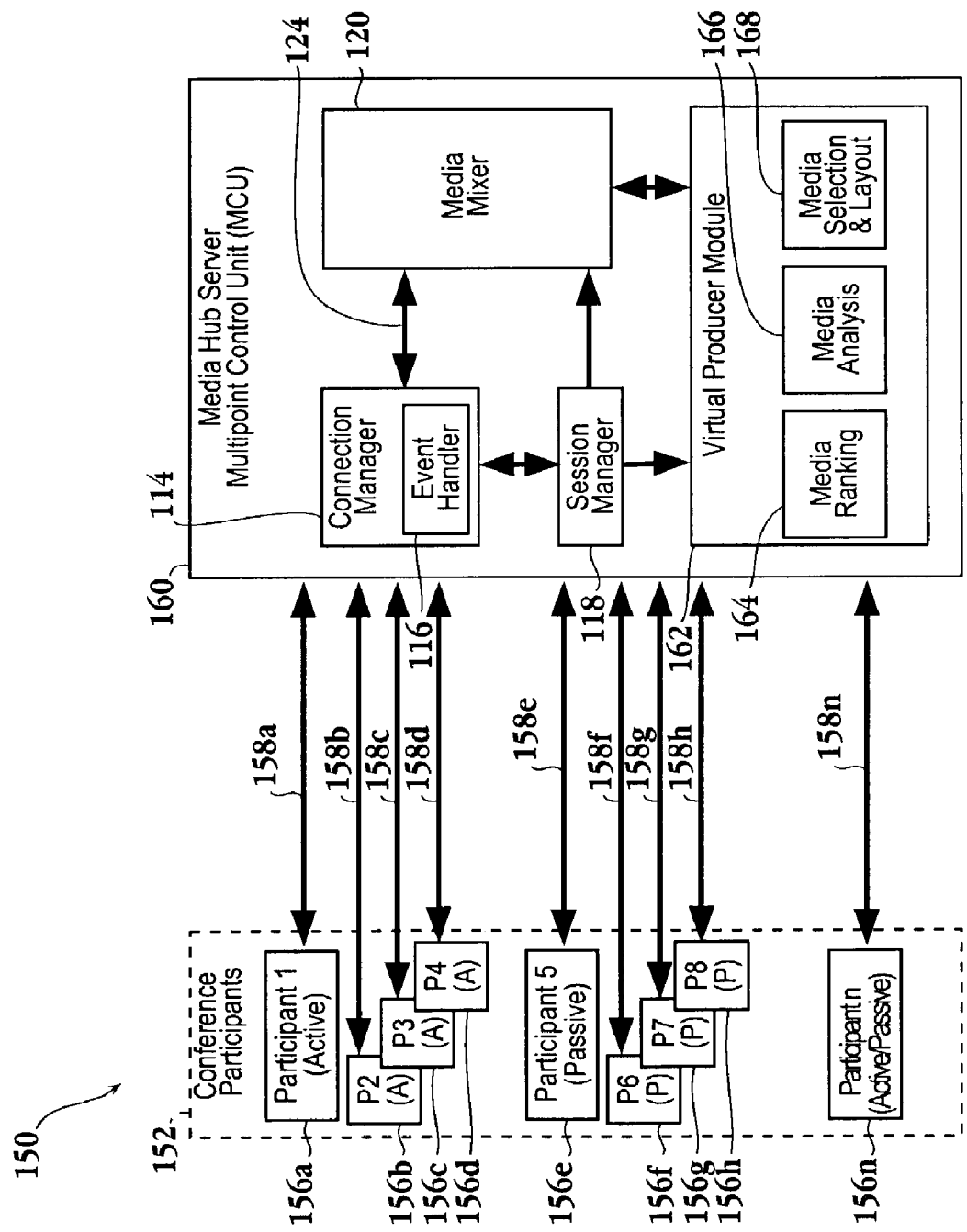
FIG. 2 is a system schematic of a multi-participant conferencing system in accordance with one embodiment of the present invention.

FIG. 2 is a system schematic of a multi-participant conferencing system 150 in accordance with one embodiment of the present invention. As described above, embodiments of the present invention can be implemented in a multi-participant conferencing system 100 as illustrated in FIG. 1, or any other suitable videoconferencing system. Essentially all of the components illustrated and described in reference to FIG. 1 are included in the multi-participant conferencing system 150 illustrated in FIG. 2, with some modification as is described in detail as follows. For clarity and simplification of illustration and explanation, conference participants 152 are illustrated to include all participants 156, collectively, and illustrated as 156a-156n. Individual participants 156a-156n are designated as active (A) or passive (P), and each participant 156a-156n should be assumed to include both a conference client and a client monitor (illustrated as conference clients A-N 104a-104n and client monitors A-N 106a-106n in FIG. 1). Client connection channels 158, illustrated as 158a-158n, should be understood to include one of a conference channel (illustrated as conference channels 108a-108n in FIG. 1) as well as a back-channel (illustrated as back-channels 110a-110n in FIG. 1), or just a conference channel, depending on the configuration of a particular participant 156. In one embodiment of the invention, an active participant 156 has a client connection channel 158 that includes both a conference channel and a back-channel. A passive participant 156 has a client connection channel 158 which includes a conference channel to enable connection to the multipoint control unit (MCU) 160, and may also have, but need not have, a back-channel. MCU 160 has been expanded to include a virtual producer module 162 as described below.

In one embodiment of the invention, virtual producer module 162 analyzes the inputs and selects a subset of the available conference media for distribution to participants 156 passively viewing the conference. Virtual producer module 162 includes a media ranking (MR) module 164, a media analysis (MA) module 166, and a media selection and layout (MSL) module 168.

The traditional role of a producer is to determine interesting content in a media and direct selected signals to the appropriate participants. Typically, a dedicated media management device attached directly to a system enables a producer in task accomplishment. A dedicated media management device has access to all available media for the producer's inspection and selection. Through the dedicated media management device, a producer can "program" the distribution system to deliver only appropriate signals to users. In systems where a producer is unavailable, preprogrammed rules provide producer-like functions. Preprogrammed rules might include, for example, displaying the video of the participant(s) who have the loudest audio signal (s), or displaying the video of only the assigned speaker.

In embodiments of the present invention, media content control is distributed among a set of active participants. In the following description, active participants are identified as active participants 156 (collectively), and should be recognized to include all active participants Participant 1 (P1), 156a, P2, 156b, P3, 156c, P4, 156d, and any active participants 156n. Similarly, passive participants are identified as passive participants 156 (collectively), and should be recognized to include all passive participants Participant 5 (P5), 156e, P6, 156f, P7, 156g, P8, 156h, and any passive participants 156n. As described in greater detail below, the system "production" occurs through mixing directions given to media mixer 120 via the participant defined layout and media selections. The virtual producer module 162 creates "virtual producers" that operate similarly. The virtual producer module 162 creates a "production" by mixing the inputs from a set of active participants 156. The set of active participants 156 contributing to the production are referred to as active producer participants 156.

Active participants 156 select individual media layouts (or they are provided) from a set of media layouts available during a conference. Media layouts are described in greater detail below in reference to FIGS. 5A-5E. The selected layout defines regions that each active participant 156 assigns to be filled with conference media by MCU 160. In effect, active participants 156 are "producing" individual local views (channels) of the conference by selecting the media to mix into the layout and to deliver. MCU 160 is aware of each active participant's 156 media and layout selections since it continually monitors those events that change the choices.

Passive participants 156 relinquish control of media content and layout to the multi-participant videoconferencing system 150. Passive participants 156 observe the videoconference, and rely on the multi-participant videoconferencing system 150 to deliver appropriate content in an appropriate layout. In one scenario, the multi-participant videoconferencing system 150 could simply provide the "produced" content of, for example, active participant P1 156a to all passive participants 156. However, P1 156a may not wish to have his "production" choices known to other participants 156 (i.e. P1 is not a producer participant), P1 156a may not have the most appropriate media selected for passive participants' 156 observation of the videoconference, and P1 156a may not be representative of all active participants 156 in the videoconference. Additionally, this simplified solution does not factor in system rules or collaboration rules that may restrict certain content from passive participants 156.

Passive participants 156 may have no explicit interaction with the multi-participant videoconferencing system 150. In one embodiment of the invention, the media content provided to passive participants 156 is manufactured by the multi-participant videoconferencing system 150. The multi-participant videoconferencing system 150 produces this content according to system rules and collaboration rules, weighted participant actions, and aggregate event markers generated by a plurality of active producer participants 156. Active producer participants 156 select and configure media content in accordance with system and collaboration rules, provide feedback, and, as described in greater detail below, provide interest markers identifying some significance of specific media content. In embodiments of the present invention, the virtual producer module 162 acts on behalf of passive participants 156 to intelligently select and configure the media content provided.

Figure 3:
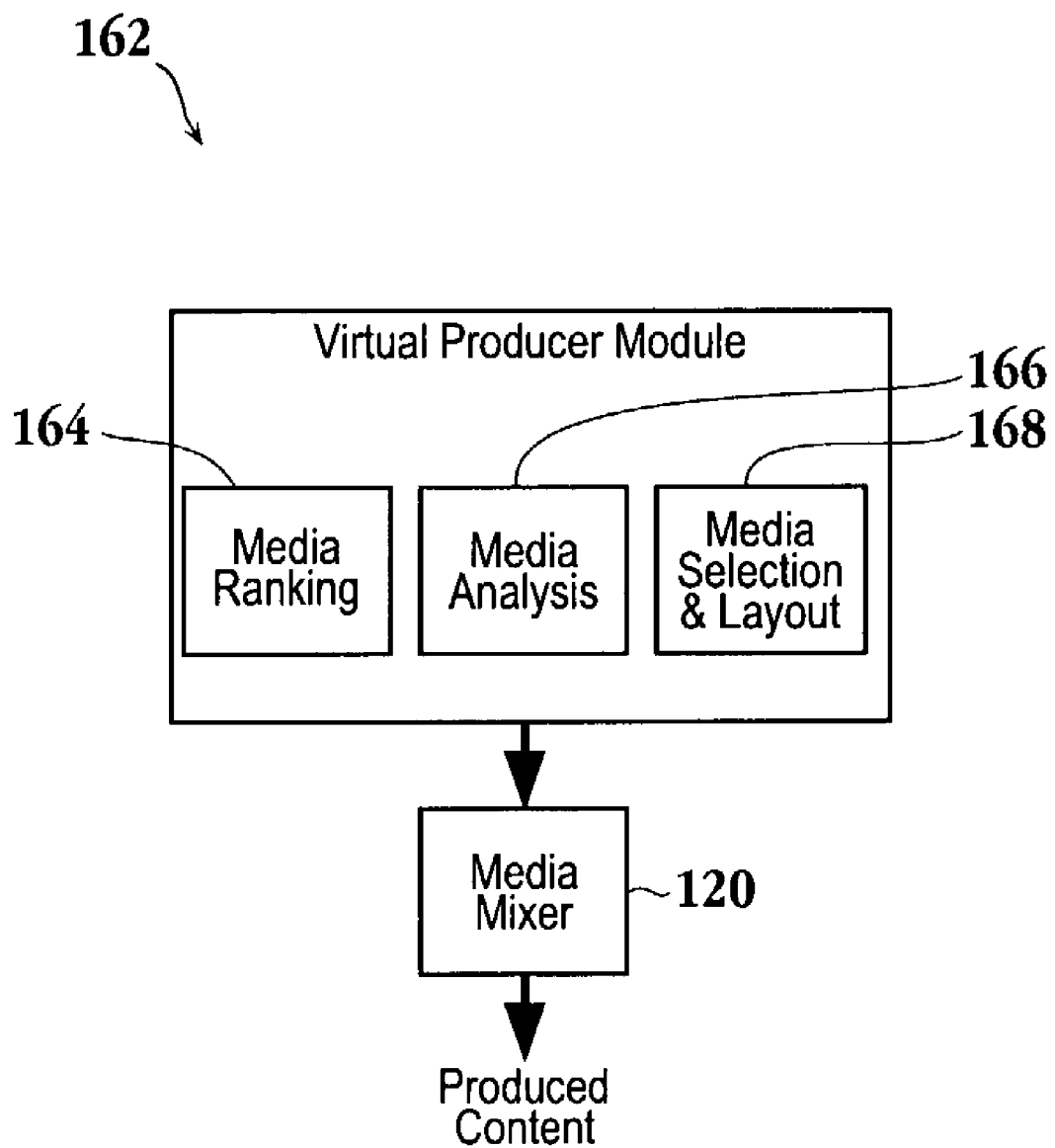
FIG. 3 is a simplified schematic of a virtual producer module in accordance with one embodiment of the invention.

FIG. 3 is a simplified schematic of a virtual producer module 162 in accordance with one embodiment of the invention. Virtual producer module 162 gathers and evaluates all system information, relevant participant activities, and conference media selections, and within the confines of system rules and collaboration rules, constructs a dedicated view of the conference. Specific inputs to virtual producer module 162 are described in detail below in reference to FIGS. 4, 6, and 7, in conjunction with the functions of the component modules of virtual producer module 162 which include a media ranking component module 164, a media analysis component module 166, and a media selection and layout component module 168. In one embodiment, output of virtual producer module 162 is to media mixer 120, directing a produced content to be delivered to passive participants 156 (see FIG. 2).

Figure 4:
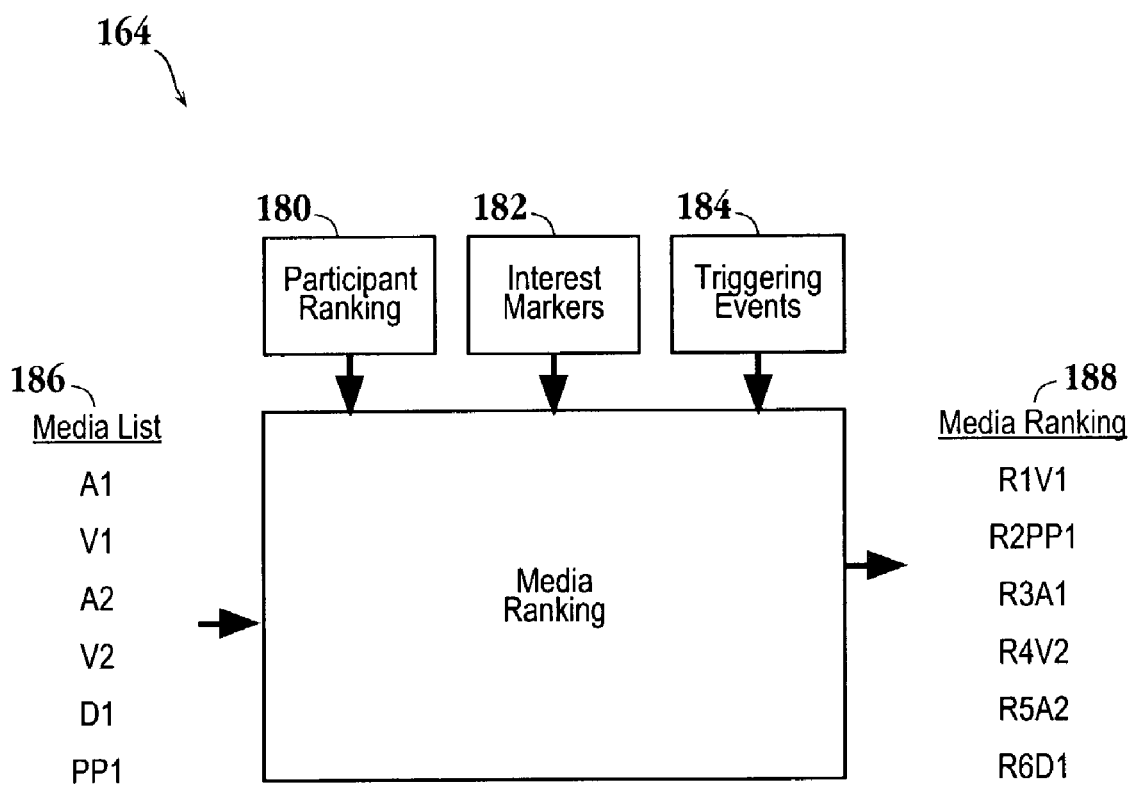
FIG. 4 is a simple diagram of the media ranking component module in accordance with an embodiment of the invention.

FIG. 4 is a simple diagram of the media ranking component module 164 of the virtual producer module 162 (see FIG. 3) in accordance with an embodiment of the invention. A produced view of a conference is composed of a layout of ranked media filling regions defined by a layout, within the constraints of system rules and collaboration rules. The ranking of media within a layout is a function of the media ranking component module 164. An active participant 156 (see FIG. 2) can select and configure media content within a layout provided by the MCU 160 (see FIG. 2). In one embodiment, an active participant 156 selects a layout from a plurality of media configuration templates provided by the MCU 160. The media content is selected from a set consisting of all media content available to a particular active participant 156. The selected media content and layout may be unique among all other active participants 156.

FIGS. 5A-5E illustrate exemplary media layouts implemented in one or more embodiments of the present invention. As used herein, a layout defines a set of regions (R1-Rn) segmenting a view. A region that overlaps another may either "cut" away (hide) the space it overlaps or it may be transparently merged with the overlapped region. Each region represents a placeholder for containing some media content available in the multi-participant videoconferencing system 150 (see FIG. 2) for a particular collaboration or conference. Examples of media include, but are not limited to, audio and video feed from conference participants, conference site or remote audio and/or video feeds, documents, slide presentations, images, etc. In a media layout, for example, the video frames available from each participant are scaled to fit within one or more of the Rn regions according to the viewing participant's unique configuration rules, with each Rn region containing one video frame.

In one embodiment, Rn regions within a media layout may be weighted among themselves according to importance, function and use, relative size, or other parameter. In one embodiment, each active participant 156 (see FIG. 2) assigns a relative importance to the Rn regions of the selected media layout. In another embodiment, an active participant 156 selects a media layout, but the relative importance of each Rn region is predetermined by the multi-participant videoconferencing system 150 (see FIG. 2), by system rules, and so forth. Typically, one region is designated the Primary (P) region and another may be designated the Server User-Interface (SUI) region. The segment SUI is reserved for server interface or configuration interfaces. Typically the dimensions of each region are controlled by the negotiated frame size between the server and the conference participants 152 (see FIG. 2), and the aspect ratio of the media content.

Figure 5A:
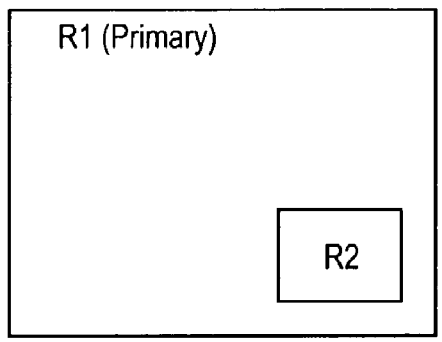
FIGS. 5A-5E illustrate exemplary media layouts implemented in one or more embodiments of the present invention.
Figure 5B:
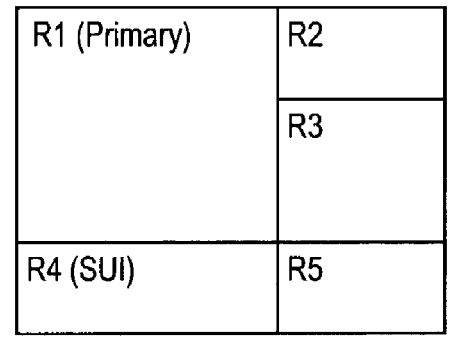
Figure 5C:
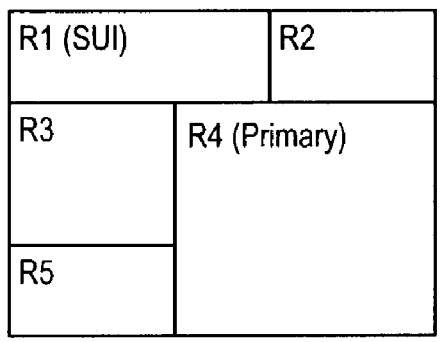
Figure 5D:
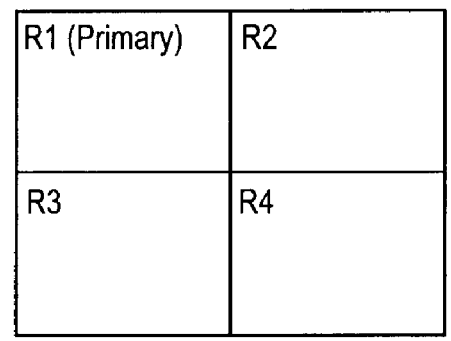
Figure 5E:
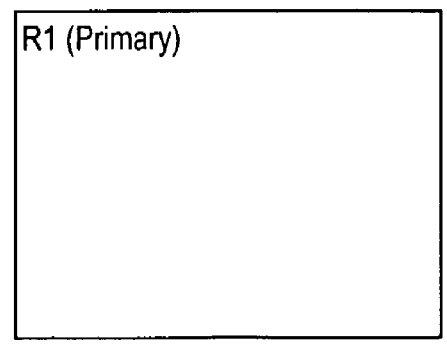

FIGS. 5A-5E are provided to illustrate a variety of exemplary media layouts available in embodiments of the present invention. In FIG. 5A, the primary region, R1 essentially fills the media layout, and a single region of secondary importance, R2, is identified in a smaller, "picture-in-picture" display. In FIG. 5B, the primary region R1 is the largest region on the left of the media layout with an SUI in a smaller region immediately below the primary region R1. The numbers assigned to each Rn (i.e., R1, R2, R3, R4, R5) are the relative rankings of the Rn regions with 1 being of most importance, relevance, or interest, and the remaining Rn regions assigned in descending order. FIG. 5C shows another multiple sized Rn configuration, and FIG. 5D shows multiple Rn regions of equal size. FIG. 5E illustrates a single Rn region filling the media layout. In one example, FIG. 5E might be the best (or only) media layout for a one-to-one collaboration.

Returning to FIG. 4, media ranking component module 164 assimilates a plurality of inputs to output a raw ranking of all available media within the multi-participant videoconferencing system 150 (see FIG. 2). Inputs into media ranking component module 164 include media list 186, participant ranking 180, interest markers 182, and triggering events 184, yielding the raw media ranking 188 output.

Media list 186 is a compilation of all media available within the multi-participant videoconferencing system for a particular collaborative exchange, e.g., for a particular videoconference session. By way of example, a particular videoconference session may have audio from a first speaker (A1), video from the first speaker (V1), audio from a second speaker (A2), video from the second speaker (V2), a first document (D1), a first POWERPOINT presentation (PP1), and so forth. Media list 186 is simply a listing of all available media which will be processed by media ranking component module 164.

Content and events introduced into the collaborative exchange may be weighted according to intended usage, as well as measured feedback. By way of example, a new presentation slide displayed by a presenter can have greater weight than a video image of the presenter at the time the presentation slide is provided for display. The delivery of a particular set of media may generate a measurable response from a significant number of active producer participants, or from an identifiable subset of active producer participants such as a subset of active producer participants located in a particular location, region, systemic subdivision, etc. Each participant's media layout also helps to establish a ranking of selected media among those selected.

In one embodiment of the present invention, media ranking component module 164 aggregates participant selections, event activity, media layouts, and so forth to assign a weight to each conference media. The raw weights assigned can then be analyzed to select and configure the media to be presented to passive participants 156 (see FIG. 2) in the collaborative exchange. In one embodiment, the ranking of the media is a tallying of the measured interest in all media available to each of the active producer participants 156 (see FIG. 2). The participant ranking input 180 is the level of interest expressed through the selection and configuration of media by each active producer participant. The selected media layout (see FIGS. 5A-5E) of each active producer participant 156 ranks the importance of all media available to a particular active producer participant 156. By way of example, each active producer participant 156 may have configured audio from a first speaker, and video from a first speaker in the R1 region (see FIGS. 5A-5E), indicating a preeminent importance of the audio and video of the first speaker. The remaining available media for each active producer participant 156 is ranked according to the level of interest or importance of the media reflected in the assimilation of the selection and configuration of available media to each active producer participant 156.

Interest markers 182 are a further indication of the relevance, significance, importance, etc., of an event, a moment in time, a portion, and so forth of any specific media to an active producer participant 156, in one embodiment. Interest markers 182 are generally sensitive to a particular point in time and can be used to rank the media for a short or long duration. In one embodiment of the invention, active producer participants 156 are enabled to assign interest markers to specific media. By way of example, an icon, menu, or selectable function located in the SUI region of a media layout (see FIGS. 5A-5E and associated discussion) is used to assign interest markers during a videoconference. In another example, a right-click over a media region of an active producer participant's 156 media layout can identify an interest marker for that particular or associated media. Interest markers 182 are captured and input into the media ranking component module 164, in one embodiment of the invention.

Typically the point of interest in a media precedes the assignment of an interest marker. This is especially true for time based content like audio or video as an active producer participant 156 processes and considers what has been seen and/or heard. In one embodiment, interest markers may be configured to define a range of media time (i.e. interest includes the prior 5, 10, or 30 seconds of media, etc.) for dynamic media such as audio and video, and may identify specific presentation slides, documents, or document pages, sections, paragraphs, and so forth, for more static media.

In one embodiment of the present invention, different types of interest markers can be configured to be processed, aggregated, and input into the media ranking component module 164. By way of example, a voting marker signals a media with a decisive action. A "YES", "Approve", "NO", "Disapprove" or other marking all provide input to the system. As this feedback can be tracked with the media, a cumulative result spanning media segments can be maintained for the set of active producer participants 156 to gauge interest. In addition to the contribution to media ranking, results can be processed in real-time for predictive nature, or actual results can be published in real-time to a speaker participant 156, and/or to other participants 156 for immediate feedback. Another type of interest marker is a topic marker which can be used to "highlight" a media for later review. Highlighting a topic identifies the area of content in a media similar to a bookmark.

Triggering events 184 identify specific media of particular relevance or interest at the occurrence of a particular action or event. In one embodiment of the invention, triggering events include the display of a new presentation slide, the introduction of a document, a new speaker, the addition of a new group or division of participants, a question and answer session, and so forth. Triggering events can be defined and tailored for particular collaboration models and conferences in accordance with desired implementation and use of the triggering event 184 input.

The media ranking 188 output of the media ranking component module 164 is the raw aggregate ranking of all available media available in the multi-participant videoconferencing system 150 (see FIG. 2) for a particular session. In one embodiment of the invention, the media ranking 188 is a list of all available media in order (descending or ascending) of measured accumulated interest, relevance, importance, significance, etc. In one embodiment, no filters, collaboration or system rules, or any other types of constraints are directly applied to obtain the media ranking 188 output. In one embodiment, it is the raw media ranking 188 that is provided to the media analysis component module for analysis and filtering as described below in reference to FIG. 6.

Figure 6:
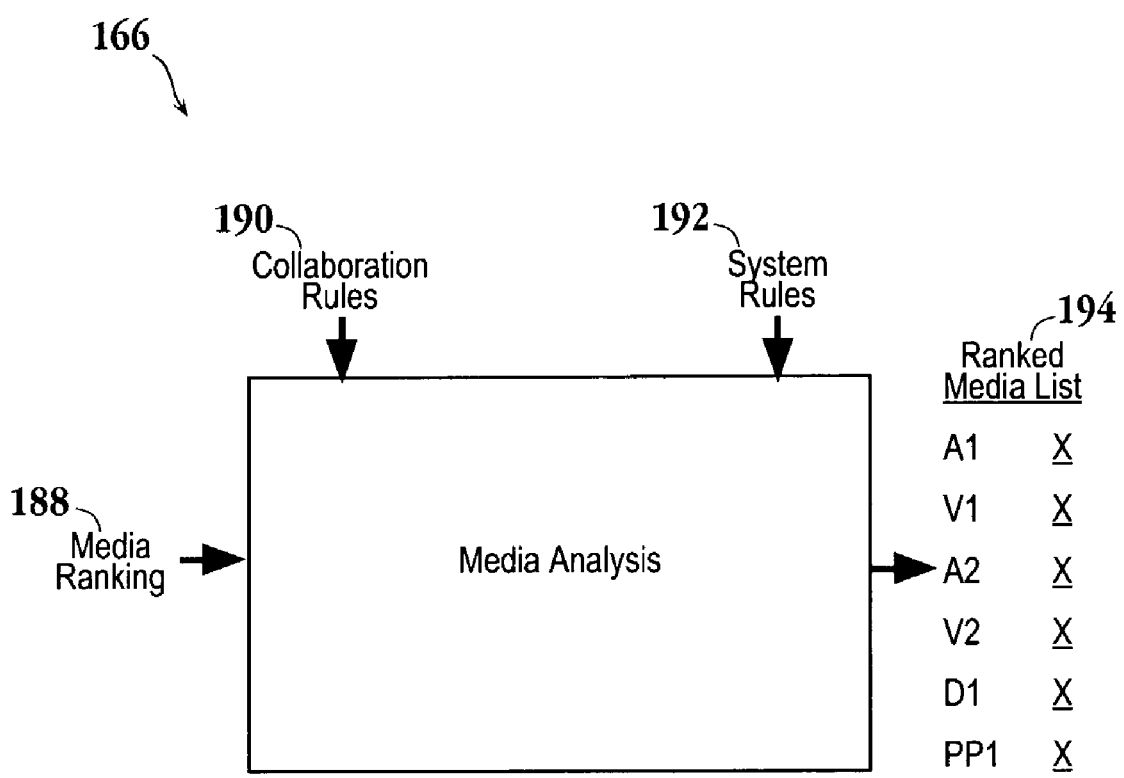
FIG. 6 is a diagram of the media analysis component module in accordance with one embodiment of the present invention.

FIG. 6 is a diagram of the media analysis component module 166 of the virtual producer module 162 (see FIG. 2) in accordance with one embodiment of the present invention. The media analysis component module 166 receives the raw media ranking 188 from the media ranking component module 164 (see FIG. 4) and analyzes the ranking of available media, as well as filtering and dampening the ranked media which, in a dynamic environment, is subject to rapid and abrupt fluctuation in interest, relevance, significance, importance, etc. In one embodiment of the invention, inputs into the media analysis component module 166 include the raw media ranking 188, collaboration rules 190, and system rules 192. A ranked media list 194, also called a weighted media list, is output.

Predictive capabilities of the virtual producer module 162 (see FIG. 2) can identify when appropriate media may need to be readily available based upon the interest markers, other media notation, historical trends, identified triggering events, and so forth. Likewise, repeated markers for a particular media at different points in time can better serve context analysis systems configured to identify media of greater importance. The media analysis component module 166 applies such learned behaviors to the media ranking 188.

Collaboration rules 190 and fixed system rules 192, also known as configuration options, may prevent media rankings from being used by a virtual producer 162 (see FIG. 2). By way of example, the collaboration rules may dictate an identified speaker participant, an active participant 156 (see FIG. 2), may be a designated primary interest media, even though an audio media from a particularly clever, amusing, or otherwise interesting other participant 156 may be receiving a consistently higher media ranking 188 from the set of active producer participants 156. In another example, system rules 192 may dictate that no video from P3 156c (see FIG. 2) is to be shown, or that all documents are provided through a separate document reader and so no documents will be configured to an Rn region of the passive participants' 156 media layout (see FIGS. 5A-5E). The media analysis component module 166 supports this functionality.

In one embodiment, media analysis component module 166 provides a buffer between the media ranking 164 and the media selection and layout 168 component modules of virtual producer module 162 (see FIG. 2) function. By way of example, media analysis component module 166 controls the timing of changes to a ranked media list 194 that might result in quick changing media selections that would likely confuse the participants. The media analysis component module 166 might be programmed to allow a change in a ranked media list 194 only after a programmable amount of time passes without a change in a raw media ranking 188. If an exchange is taking place between two or more participants, a "ping-pong" effect is thereby dampened or eliminated by media analysis component module 166. A media layout can be modified, changes in media can be dampened, audio volume or other media configurations can be modified, or other such measures can be implemented to minimize distractions or confusing presentations for passive participants 156 (see FIG. 2).

In one embodiment, interest markers 182 and of course other events such as triggering events 184 (see FIG. 4) are provided to media analysis component module 166 (not shown in FIG. 6) in addition to being input to media ranking component module 164 (see FIG. 4). Analysis of "clusters" of interest markers and "trends" of event activities can enhance a passive participant's 156 (see FIG. 2) experience of the videoconference. Interest regions point to a media space where a cluster of activity or a trend of activity has occurred (or is occurring). A cluster of activity is defined by a function such as events over some short time interval. Clusters may be categorized based upon type of event or relationship among events. For example, a large set of active participants 156 (see FIG. 2) generates activity such as choosing to view a particular conference member as their primary media or assigning interest markers to the media. All activity is found to occur during a small interval of time. This would classify a cluster, and an interest region would be identified by the system. A cluster interest marker may be assigned by the system to note this interest region to effect future analysis for media ranking and selection. A cluster interest marker may be used by the system to effect a media ranking or a timing of change to a media ranking by a scale, or weight, larger than that of a single interest marker or event ranking activity.

In some cases a trend of activity, as opposed to a cluster of activity, is detected. If over a longer interval, for example, a set of participants 156 begins to watch a given participant more than another participant, a trend of activity is identified. An interest region spanning the media of the given participant may be created to highlight the relative interest the set of participants 156 are finding in the media. A trend interest marker may be assigned by the system to note this interest region to effect future analysis for media ranking and selection. Trends of cluster interest markers may too be identified by the system. A trend interest marker may be used by the system to effect a media ranking or a timing of change to a media ranking by a scale, or weight, larger than that of other interest markers or event ranking activities.

A system function that analyzes such activity and labels interest regions may include one that watches for a majority of participants to be viewing a particular media. At such a time, the system may create its own interest marker on the media to denote an important shift in the participant's viewing. Likewise, a speaker participant 156, or other participant 156, may wish to signal an important topic and generate an explicit, more weighty, interest marker. Such interest markers might have a direct impact on the media ranking processes, or might be used in the media analysis component module 166 in accordance with system rules 192 to modify the ranked media list 194 output accordingly.

In one embodiment of the invention, the media analysis component module 166 generally applies collaboration rules 190 and system rules 192, performs buffering, and may perform any or all of trending interest marker input, requiring access to a media signal from the media mixer 120 (see FIG. 2), and/or using another producer module 162a (see FIG. 8 and related discussion) processing to determine a ranked media list 194 to, for example, resolve a "tie" in media ranking, etc.

The output of the media analysis component module 166 is a ranked media list 194. In one embodiment, a ranked media list 194 is a list of all media available to a passive participant 156 (see FIG. 2) with a ranking or weight assigned. As described above, all media in the system is not necessarily available to a passive participant 156. The ranked media list 194 is essentially the input media ranking 188 that has been buffered, dampened, or otherwise filtered in accordance with collaboration rules 190, system rules 192, and in one embodiment, interest markers (not shown in FIG. 6). In FIG. 6, the ranking or weight assigned to the ranked media list 194 is illustrated as "X" indicating a rank or weight assigned to each media available to a passive participant 156, but any suitable means of prioritizing or indicating a level of interest in each available media can be utilized. The ranked media list is then used by the media selection and layout component module 168 as described below in reference to FIG. 7.

Figure 7:
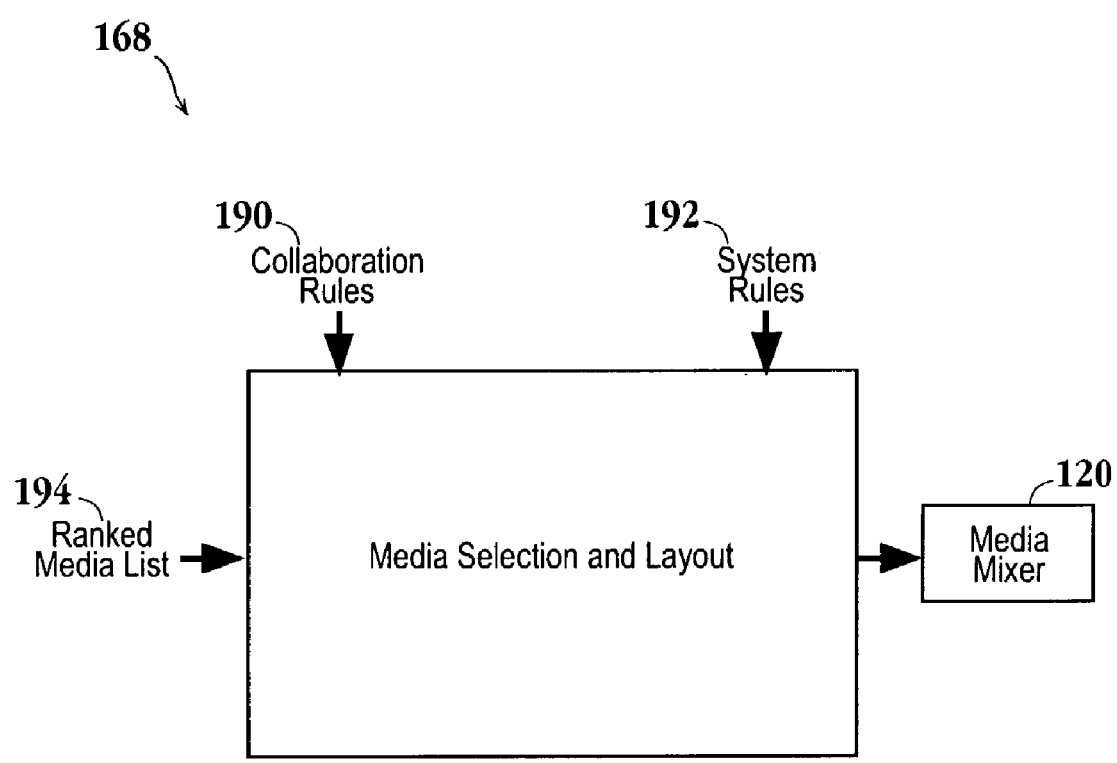
FIG. 7 is a diagram of the media selection and layout component module in accordance with an embodiment of the invention.

FIG. 7 is a diagram of the media selection and layout component module 168 in accordance with an embodiment of the invention. The ranked media list 194 is input into the media selection and layout component module 168 from the media analysis component module 166 (see FIG. 6), and the output is sent from the virtual producer module 162 (see FIG. 2) to media mixer 120. After a raw ranking of media followed by an analysis of ranking in light of collaboration rules, system rules, and interest markers, a selection of media and a media layout must be made. The selections will be sent to media mixer 120 to construct the produced content and view to be provided to the passive participants 156 (see FIG. 2).

In one embodiment, collaboration rules 190 and system rules 192, functioning in essentially the same manner as described above in reference to FIG. 6, are input into the media selection and layout component module 168 to further filter the media content in addition to filtering the media layouts that are available to passive participants 156 (see FIG. 2). Initially, a simple layout (i.e. one containing only a few regions for media) may be selected. In one embodiment, a layout selection by active participants 156 (see FIG. 2) defines a ranking of layout choices that may be considered for providing to passive participants 156. Based upon a count of high ranking media and a relative spread among all media in the ranked media list 194 with respect to importance, new layouts may be selected to accommodate and present the most useful set of media. Changing a layout frequently or regularly can be distracting for the user, and in one embodiment, system rules 192 buffer or dampen any changes as they occur in the ranked media list 194. Additionally, collaboration rules 190 and system rules 192 may define a specific layout to be used. In either case, once a layout is selected, the "best" media as determined by the virtual producer module 162 (see FIG. 2) are filled within the view.

It should be appreciated that media that are not selected for presentation to passive participants 156 (see FIG. 2), as well as those media not selected by active participants 156 (see FIG. 2), are candidates for system performance modifications. For example, media that are not available or utilized in a virtual producer module 162 (see FIG. 2) may be unimportant with respect to the conference and could have the corresponding data rate reduced. This would provide more system bandwidth for the "interesting" media.

A virtual producer, as described herein, acts on behalf of the passive participants. By gathering and evaluating all system information, and relevant sets of active participant activities and conference media selections, the virtual producer constructs a dedicated view of the conference for a set of passive participants. In one embodiment of the present invention, the implementation of a virtual producer module 162 (see FIG. 2) can be scaled to accommodate any number of virtual producers. As described above, multi-participant videoconferencing system 150 (see FIG. 2) can accommodate a plurality of defined groups of participants. Defined groups of passive participants can differ in interests and needs with regard to the produced content delivered. In one embodiment, additional virtual producer modules 162 can be added to a multi-participant videoconferencing system 150 by adding more virtual producer modules 162 to the system as illustrated in FIG. 2, or by adding virtual producer modules 162 to networked peers within the multi-participant environment. In another embodiment, logical subdivisions of each component module, i.e., the media ranking 164, media analysis 166, and media selection and layout 168 component modules, within the overall virtual producer module 162 can be defined to create a plurality of virtual producers to accommodate defined groups, divisions, conference sites, interest regions, and so forth. For example, a set of participants at one conference site may more accurately "produce" the content of interest for participants from their locale. The virtual producer defined for the identified group or set of participants may operate differently from that defined for another site in the conference. Likewise, the set of participants that make-up a given virtual producer may change during the course of a conference as when a different speaker from another site begins his presentation. Thus, the system could also construct a "global" virtual producer for the entire conference made from the combined productions of all "local" virtual producers.

Figure 8:
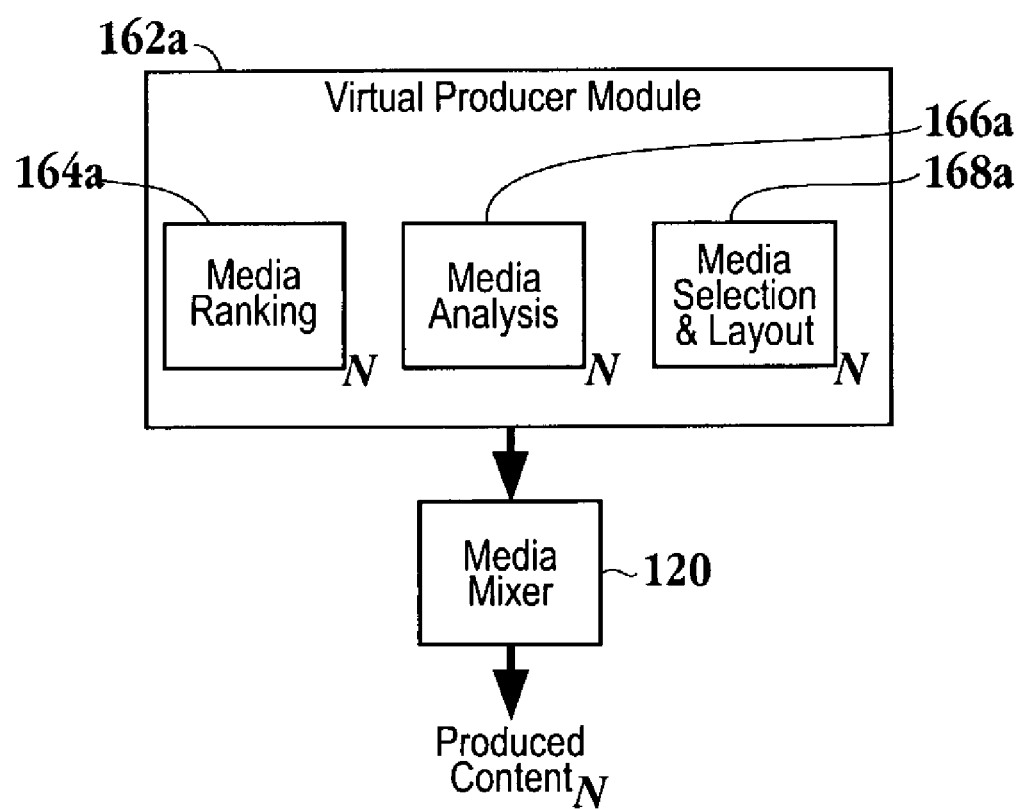
FIG. 8 is a diagram of a virtual producer module configured to provide multiple outputs of produced content in accordance with one embodiment of the invention.

FIG. 8 is a diagram of a virtual producer module 162a configured to provide multiple outputs of produced content in accordance with one embodiment of the invention. In FIG. 8, component modules are identified by the subscript annotation "N" to indicate a plurality of logical subdivisions of each component module. Therefore, media ranking component module 164a, media analysis component module 166a, and media selection and layout component module 168a represent a plurality of component modules. Each set of component modules, i.e., each set having one media ranking component module 164a, one media analysis component module 166a, and one media selection and layout component module 168a, operates as described above to provide a produced content for a defined group, subdivision, conference site, and so forth. The produced content provided to each defined group, subdivision, conference site, and so forth, is uniquely produced for the appropriate group in accordance with that group's system rules, collaboration rules, interest markers, and so forth. As described above, in another embodiment a plurality of virtual producer modules operate essentially as peers to provide the unique produced content for a defined group.

Figure 9:
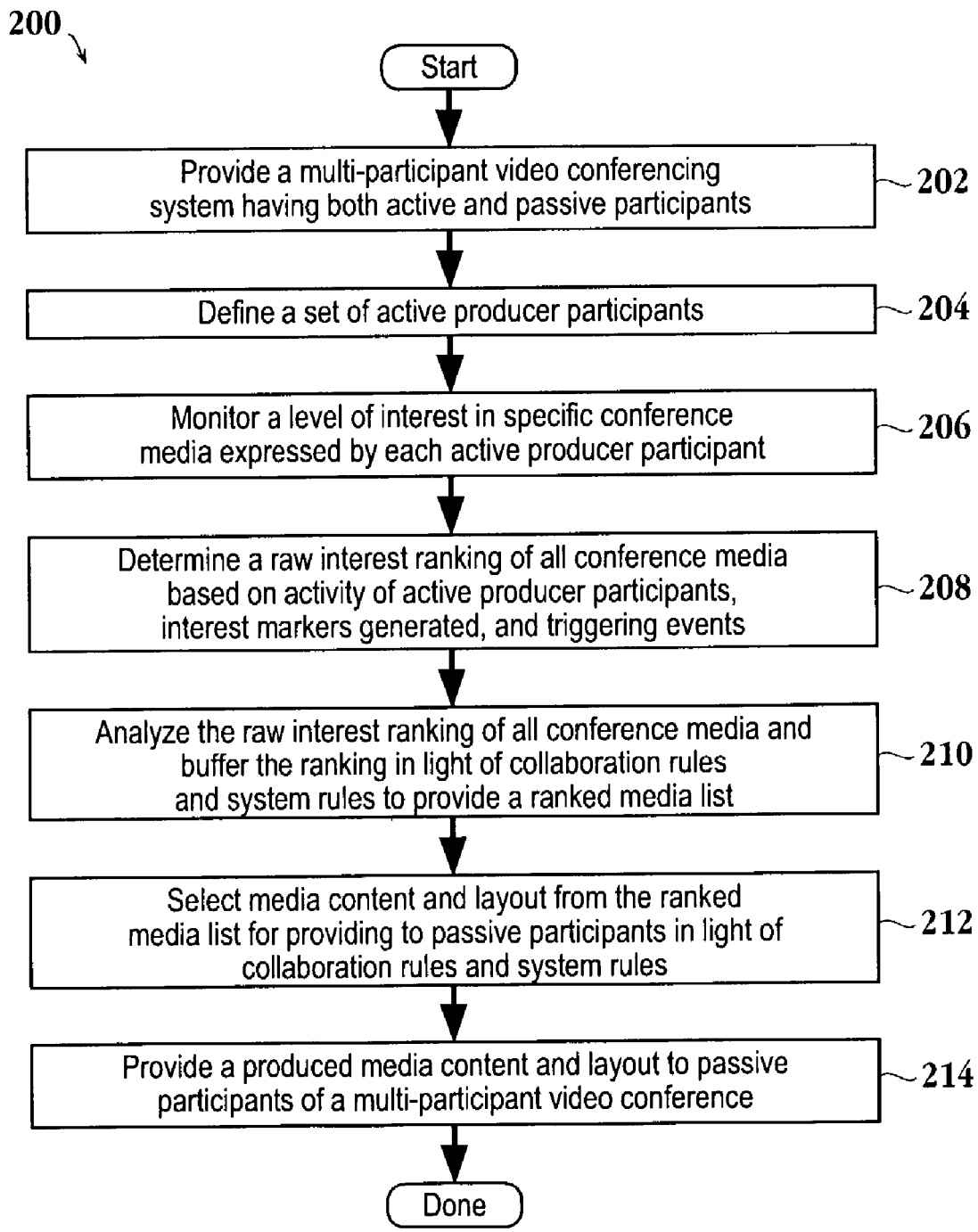
FIG. 9 is a high-level flow chart diagram illustrating the method operations performed in providing produced media content to passive participants in a multi-participant videoconferencing system in accordance with one embodiment of the present invention.

FIG. 9 is a high-level flow chart diagram 200 illustrating the method operations performed in providing produced media content to passive participants in a multi-participant videoconferencing system in accordance with one embodiment of the present invention. The method begins with operation 202 and the providing of a multi-participant videoconferencing -system having both active and passive participants. In one embodiment, the multi-participant videoconferencing system is as illustrated and described above in reference to FIG. 2.

The method continues with operation 204 in which a set of active producer participants is defined. In one embodiment of the invention, produced content is obtained based on the interest and activity expressed by the active participants in a videoconference environment. Some participants, however, may not desire or may not be configured nor allowed to contribute media content, layout, interest, etc., to the production of content for passive listeners. A producer participant is a subset of active participants. Media selection, layout, and interest markers expressed by active producer participants are input into a virtual producer module for use in developing produced content to be delivered to passive participants in the videoconference.

Next, in operation 206, the level of interest in specific conference media expressed by each active producer participant is monitored. In one embodiment, the multi-participant videoconference system includes a back-channel link between active participants and the multipoint control unit. A client monitor of each active participant is used to monitor media content selection, media layout, and specifically expressed interest through, for example, interest markers. The monitored parameters of active producer participants is provided to the virtual producer module for use in developing a produced content for passive participants in the conference.

The method continues with operation 208 in which a raw interest ranking of all conference media based on activity and interest markers of active producer participants, triggering events, etc., is determined. In one embodiment, the raw interest ranking is determined for all media in the conference without regard to system rules, collaboration rules, level of usage, etc. As described above in reference to FIG. 4, the raw ranking is determined in the media ranking component module of the virtual producer module.

In operation 210, the raw interest ranking is analyzed, buffered, filtered, and dampened in light of system rules and collaboration rules as described above in reference to FIG. 6. In one embodiment, system rules and collaboration rules limit the media available to passive participants. Further, rapid and frequent changes in media interest can be distracting or confusing for passive participants, and such changes require consideration, filtering, dampening, etc., prior to selection of the most appropriate content and layout to provide. Additionally, trends, particular groups, settings, content, participants, and so forth can all effect the ranking of the most appropriate media that will be available to a passive participant.

The method continues with operation 212 in which a media content and layout is selected from the ranked media list for providing to passive participants in light of collaboration rules and system rules. In one embodiment, the media selection and layout is performed by the media selection and layout component module of the virtual production module as illustrated and described above in reference to FIG. 7.

The media content selection and layout is provided to the media mixer, and in operation 214 a produced media content and layout is provided to passive participants of the multi-participant videoconference. The produced content is dynamic in that the adaptive content delivery system is responsive to both passive participant needs and changes in active producer participant interest. In one embodiment, the produced content is tailored to provide a unique produced content to a plurality of defined passive participant groups or subdivisions, and responsive to the changes in both content and participants over the course of the conference. With the on-going delivery of produced content over the course of the conference, the method is done when delivery to passive participants is no longer desired.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A conferencing system supporting active participants and passive participants during a conference session in which the active participant has assigned control to select and to configure media for the active participant and the passive participant has no control over media exchange, the conferencing system selects and provides the media to the passive participant, the conferencing system comprising:
    a client having a memory storing program instructions configured to identify whether a corresponding participant is one of the active participants or one of the passive participants; and
    a server having a connection to each of the active participants and to each of the passive participants, wherein the server communicates with the active participants over both a conference channel and a back channel, the server configured to execute videoconferencing software that defines
        a connection manager for managing the connection between the each of the active participants and the each of the passive participants and the server;
        a media mixer for receiving conference media and for distributing the conference media to the active participants and the passive participants; and
        a virtual producer for selecting the conference media to be distributed to the passive participants, wherein a layout of the conference media provided to the passive participant is dynamically determined based upon input selections sent from a set of the active participants via the back channel that are analyzed by the virtual producer during the conference session;
        wherein the virtual producer includes a media ranking module that provides a raw media ranking of all of the conference media based on a list of the all of the conference media of a particular conference, an active participant ranking of the conference media, interest markers associated with the conference media, and indications of triggering events associated with the conference media; and
        wherein the virtual producer provides the conference media and the layout of the conference media to the passive participants based on the raw media ranking of the all of the conference media.

2. The conferencing system of claim 1, farther comprising an event handler, the event handler working in cooperation with the connection manager to monitor participant activity and provide information about the participant activity to the media mixer.

3. The conferencing system of claim 1, further comprising a session manager, the session manager being a part of a server component and being configured to define rules of collaboration and rules of the media exchange, wherein the rules of collaboration and the rules of the media exchange control availability of the conference media to the active participants and the passive participants.

4. The conferencing system of claim 1, wherein the virtual producer includes a media analysis module, and a media selection and layout module.

5. The conferencing system of claim 4, wherein the media analysis module receives the raw media ranking of the all of the conference media and analyzes the all of the conference media to provide a media ranking of the media suitable for providing to the passive participants, the media analysis module using system rules and collaboration rules to analyze the raw media ranking of the all of the conference media.

6. The conferencing system of claim 4, wherein the media selection and layout module receives the media ranking of the media suitable for providing to the passive participant and selects media content and a layout for the media content selected to be provided to the passive participant.

7. The conferencing system of claim 1, wherein the connection manager is a peer endpoint for the corresponding participant.

8. A video conferencing system supporting active participants and passive participants during a video conference session in which the active participant has assigned control to select and to configure media for the active participant and the passive participant has no control over media exchange, the conferencing system selects and provides the media to the passive participant, the conferencing system comprising:
    a plurality of clients wherein a portion of the plurality of clients are identified as the active participants and a remainder of the plurality of clients are identified as the passive participants, each of the plurality of clients having a memory storing program instructions configured to identify the plurality of clients as one of the active participants or one of the passive participants; and
    a server in communication with the each of the plurality of clients during the video conference session, the server communicating with the active participants over both a conference channel and a back channel, the server communicating with the passive participants over the conference channel, the server configured to capture input selections of the active participants to organize a layout of conference media for presentation to the passive participants during the video conference session, the sewer further configured to monitor the input selections sent from the active participants via the back channel to adjust the layout of the conference media during the video conference session; wherein the sever is configured to execute videoconferencing software that defines a virtual producer for selecting the conference media to be distributed to the passive participants;

wherein the virtual producer includes a media ranking module that provides a raw media ranking of all of the conference media based on a list of the all of the conference media of a particular conference, an active participant ranking of the conference media, interest markers associated with the conference media, and indications of triggering events associated with the conference media; and wherein the virtual producer provides the conference media and the layout of the conference media to the passive participants based on the raw media ranking of the all of the conference media.

9. The video conferencing system of claim 8, wherein the server collects the input selections and assigns a weight to rank layouts of the conference media according to the input selections.

10. The video conferencing system of claim 8, wherein the server includes a time delay prior to presenting adjustments of the layout of the conference media to the passive participants.

* * * * *